United States Patent Office

Re. 26,565
Reissued Apr. 29, 1969

26,565

2-ORTHO-HYDROXY-PHENYL-4-(3H)-QUINAZOLINONES

John Leo Rodgers, Somerville, and Jerry Peter Milionis, Franklin Township, Somerset County, N.J., assignors to American Cynamid Company, Stamford, Conn., a corporation of Maine No Drawing. Original No. 3,169,129, dated Feb. 9, 1965, Ser. No. 279,631, May 10, 1963. Application for reissue Mar. 2, 1966, Ser. No. 536,533
Int. Cl. C07d *51/48;* F21v *9/02*
U.S. Cl. 260—251 9 Claims

Matter enclosed in heavy brackets [ ] appears in the original patent but forms no part of this reissue specification; matter printed in italics indicates the additions made by reissue.

This invention relates to the emission of visible light from objects exposed to radiation from a suitable source of exciting energy such as ultraviolet light. More particularly, it deals with surfaces or layers capable of being thus excited to emit visible light. Still more specifically, it is concerned with such light-emitting surfaces which comprise in a solid form a compound characterized by having very little or no visible color in white light and having superior stability to deterioration when exposed to ultraviolet irradiation.

Primarily, the present invention is concerned with such compounds represented by the formula:

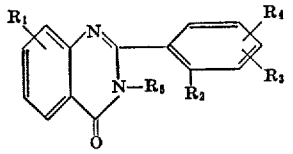

(I)

wherein $R_1$, $R_2$, $R_3$ and $R_4$ each represent hydrogen or a substituent such as halogen, hydroxyl, an alkyl or alkoxy of 1–4 carbons; and $R_5$ represents hydrogen or an alkyl of 1–4 carbons. Within this group of compounds, a preferred subclass is that in which $R_2$ is hydroxyl and the other "R's" are as defined above. Accordingly, they are used herein for the purposes of primary illustration.

Fluorescence, or the emission by certain materials (phosphors) of light energy (luminescence) of one wavelength when irradiated by "exciting light" of a different wavelength, usually lower, has been well-known for many years. Also well-known is the phenomenon of phosphorescence exhibited by some materials, i.e., persistence of the luminescence after removal of the source of exciting radiation. In the past, various practical applications of fluorescent phenomena have been proposed with varying degrees of success.

Usually these involved irradiation with ultraviolet light, resulting in illumination by emission of visible light at longer wavelengths. For such purposes, inorganic phosphors have had quite wide application. In general, however, organic materials have been found applicable only in very few instances, being limited, in part, by a lower degree of stability than inorganic materials under the types of irradiation encountered. Moreover, most of the applicable compounds have been dyes such as rhodamine, which are self-colored. This is definitely undesirable for many potential applications.

Fluorescence is also involved in the field of brighteners or optical bleaches. Here, organic materials have been applied with great success on a broad commercial scale. However, organic materials found useful for such purposes have not been found generally useful for fluorescent illuminating purposes. In large part this is due to minimal fluorescence of the material in the solid state and to relative instability and decided degradation under continued exposure to exciting radiation in the ultraviolet range.

In the illuminating field, as noted above, some limited use of organic materials as fluorescers has been proposed. One such is in application as screens, not as a major source of illumination but for purposes of shading or modifying the color or tone of light from some other source. Such a screen may be used to improve the spectra of light sources deficient in one or more spectral color elements to a more desirable spectrum or shade of light.

One example of such application is found in U.S. Patent No. 1,150,118. Therein, a fluorescent screen or surface using an organic material such as a rhodamine dye is used to impart an improved color value to illumination emitted from a mercury vapor lamp, i.e., to produce a whiter light closer to daylight than is the greenish-blue tone of light normally produced by a mercury vapor lamp. Thus, such a light transforming screen or reflector is useful for converting some of the rays of the light source to light of a more desirable wavelength. Such sources could be mercury vapor lamps or tungsten or carbon filament lamps. Other illustrations are found for example in U.S. Patents Nos. 2,177,701 and 2,149,992. Fluorescence phenomena have also been applied to coating compositions, for example, in uses involving pigment compositions.

However, one of the principal deterents to wider use of organic materials in fluorescent screens or films still remains the relative instability encountered on prolonged exposure to exciting ultraviolet light and/or the relatively weak fluorescence in the solid state. Thus, for example, many of the compounds useful as brighteners or optical bleaches do show the desired shades of fluorescence but lack sufficient stability against deterioration when exposed to ultraviolet exciting light for extended periods. Moreover, many fluoresce only weakly or imperceptibly in the solid state.

Consequently, in illumination, and in related arts, there remains a definite need for suitable fluorescent low-cost, organic materials. Such materials should exhibit little or no visible color in white light. Under ultraviolet irradiation in the solid state they should fluoresce strongly in desirable shades. They should be adequately stable to the effect of such irradiation as well as to the effect of heat for extended periods.

Such materials would be extremely useful for a variety of applications, especially in the illumination field or in other fields where fluorescence is desirable. Thus, in the illumination field, screens or panels giving various shades of light under excitation would be useful, not only for general illumination but to produce novel or theatrical effects, signs, coating compositions, fluorescent finishes, fluorescent lamps and the like.

It is, therefore, the principal object of the present invention to provide such organic materials. In the present invention this object has been accomplished to a surprisingly successful degree by the discovery and use of the compounds of Formulae I which were discussed above. In accordance with the present invention, it has been found that colorless or nearly colorless compounds so defined show strong fluorescence in the solid state, give off desirable shades of visible light when irradiated with ultraviolet light; have a high degree of stability to the effect of heat; and do not excessively deteriorate or lose fluorescence during exposure to ultraviolet light, even over prolonged periods.

Accordingly, these compounds are highly useful in applications requiring emission of visible light on exposure to ultraviolet light. They may be formulated successfully in solid form in screens, films, coatings, and the like to obtain the fluorescent effects desired. Discovery of the fluorescent properties and stability of these compounds in the solid state and their applicability for fluorescent purposes was completely unpredictable and unexpected.

It is an advantage of compounds used in the present invention that they may be prepared by known general methods of synthesis. Among such methods, the following have been found convenient.

Method (A).—Reaction of an aroyl anilide with urethane (ethyl ester of aminoformic acid) in the presence of phosphorus pentoxide. This may be illustrated by the following reaction scheme:

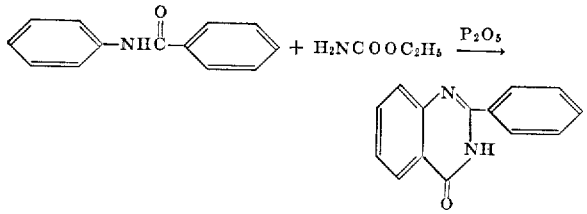

Although yields by this method generally are not as high as might be desired, this method often is convenient. It affords a procedure for obtaining various substituted derivatives from more readily available or more easily prepared starting materials. Thus, by choosing appropriately substituted anilides, the desired substituted quinazolones may be prepared. Illustrative aroyl anilides which may be used in this method include:

p-Anisanilide
4′-butyl-p-anisanilide
4′-chloro-p-anisanilide
4′-bromo-p-anisanilide
4′-bromo-p-anisanilide
Benzanilide
4′-methylbenzanilide
4′-chlorobenzanilide
2′-chlorobenzanilide
p-Benzanisidide
p-Anis-o-anisidide
p-Anis-p-anisidide
4,4′-dichlorobenzanilide
2,4′-dichlorobenzanilide
2-methyl-4′-chlorobenzanilide
2-methyl-4′-butylbenzanilide Method (B).—Reaction of an anthranilamide with an aromatic aldehyde by heating in the presence of a solvent, such as ethanol, to give an anil type which then is ring closed to a dihydroquinazolone in the presence of caustic; the dihydroquinazolone then being oxidized to the corresponding quinazolone. This may be illustrated by the following reaction scheme:

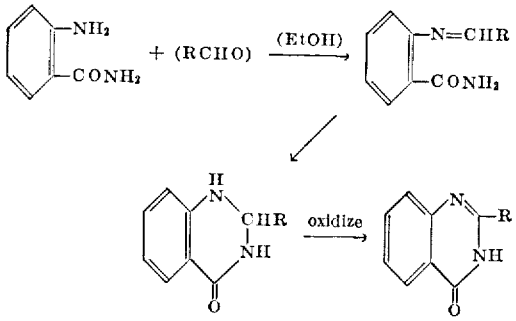

This procedue also may be used to obtain substituted derivatives by using appropriately substituted starting materials. Illustrative anthranilamides, for example, include those having chloro- or bromo-substituents in the 4- or the 5-position. Illustrative aldehydes include, for example:

| | |
|---|---|
| Benzaldehyde | 2,4-dimethoxybenzaldehyde |
| o-Anisaldehyde | 2-chlorobenzaldehyde |
| p-Anisaldehyde | 4-chlorobenzaldehyde |
| m-Anisaldehyde | 4-bromobenzaldehyde |

Method (C).—By cyclization of N-aroyl anthranilamides under alkaline conditions as illustrated in the following reaction scheme.

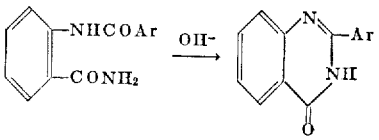

Here again substituted derivatives may be prepared by having appropriate substituents in the starting materials.

Various known methods are available for evaluation of these compounds as organic fluorescent materials; for example determination of the color and strength of fluorescence; the stability on irradiation; and the like. Stability, however, may vary appreciably, depending on the test conditions. For example, in solution some compounds may be relatively unstable yet in the solid state show extremely high stability. Thus, for example, when certain compounds are incorporated in cellulose acetate and exposed to UV light in a "Fade-Ometer" they may show stability of seemingly low order. However, the same compound in the solid state, as in the form of a thin film deposited from solution, in many instances shows a very high degree of stability.

Different compounds of the present invention when exposed to UV light show fluorescence in various colors. As stated above, they may show varying degrees of stability. Also as noted above, preferred compounds of the invention, especially as to stability and as to intensity and shade of emitted visible light when exposed to UV are those of Formula I in which $R_2$ is an ortho-hydroxy substituent. Among these, 2-(2-hydroxyphenyl)-4(3)-quinazolone is especially desirable because of its shade of fluorescent light and high stability.

Compounds of the invention may be used in a very large variety of applications, based on their fluorescence and stability properties. Thus, for example, they may be used in lighting panels; in various types of plastic compositions; in inks, paints and the like; or in any application applied to a surface or in a film for emission of visible light upon exposure to UV light. A specific application of interest is the use of a fluorescent compound of the invention in printing inks, paints, enamels and other surface coating compositions to produce a composition which has one appearance by daylight and a completely different appearance or color under UV or black light. Such effects are useful for various decorative uses and for purposes of identification or security.

As fluorescers, compounds, of the invention absorb UV light and by virtue of this property also have some application as protective agents in plastic compositions, that is as UV absorbers. In such cases, it is the UV-absorbing property which is important rather than conversion of incident UV light to emitted visible light.

This invention will be further illustrated in conjunction with the following examples. Therein, unless otherwise noted, all parts and percentages are by weight and temperatures are in degrees centigrade. Preparation of the 4(3)-quinazolones is illustrated by Examples 1–37 inclusive. Preparation of the preferred 2-(2-hydroxylphenyl)-4(3)-quinazolones which are believed to be new compounds is illustrated in Examples 22–37. Properties and uses of these compounds are shown in the remaining examples.

EXAMPLE 1

Preparation of 2-(4-methoxyphenyl)-4(3)-quinazolone

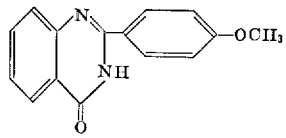

As illustrative of the procedure of Method (A): a mixture of 22.7 g. of p-anisanilide, 8.9 g. of urethane, 112 g.

of $P_2O_5$ in 250 g. of toluene is refluxed with vigorous stirring for 3 hours. The toluene is decanted and the remaining solid is added to crushed ice. The suspension is treated with aqueous sodium hydroxide to neutralize and the crude product collected. This is recrystallized from ethanol; M.P. 245°–246.5° C.

EXAMPLES 2–15

The procedure of Method (A) as shown in Example 1 is repeated, substituting for the p-anisanilide equimolar amounts of various anilides and anisidides. Starting materials and resultant -4(3)-quinazolones are shown in the following table.

TABLE I

| Ex. No. | Starting Material | -4(3)-quinazolone |
|---|---|---|
| 2 | Benzanilide | 2-phenyl |
| 3 | p-Benzanisidide | 6-methoxy-2-phenyl- |
| 4 | p-Anis-p-anisidide | 6-methoxy-2-(4-methoxyphenyl)- |
| 5 | 4'-butyl-p-anisidide | 6-butyl-2-(4-methoxyphenyl)- |
| 6 | p-Anis-o-anisidide | 8-methoxy-2-(4-methoxyphenyl)- |
| 7 | 4'-chlorobenzanilide | 6-chloro-2-phenyl- |
| 8 | 2'-chlorobenzanilide | 8-chloro-2-phenyl- |
| 9 | 3-chlorobenzanilide | 2-(3-chlorophenyl)- |
| 10 | 4-ethylbenzanilide | 2-(4-ethylphenyl)- |
| 11 | 4'-chloro-4-butoxybenzanilide | 6-chloro-2-(4-butoxyphenyl)-1 |
| 12 | 4'-ethoxy-2-ethylbenaznilide | 6-ethoxy-2-(2-ethylphenyl))- |
| 13 | 4'-bromo-3-chlorobenzanilide | 6-bromo-2-(3-chlorophenyl- |
| 14 | 2'-propoxy-3,5-dibromobenzanilide. | 8-propoxy-2-(3,5-dibromophenyl)- |
| 15 | 4'-ethyl-4-hydroxybenzanilide | 6-ethyl-2-(4-hydroxyphenyl)- |

EXAMPLE 16

2-phenyl-4(3)-quinazolone

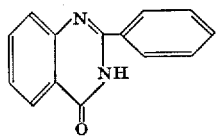

As illustrative of Method (B), a solution containing 204 g. of anthranilamide and 2 ml. of conc. HCl in 800 ml. of ethanol is treated with 160 g. of benzaldehyde followed by heating for 30 minutes. Ten percent aqueous sodium hydroxide (2.7 liters) is then added and the mixture is heated to distil off the ethanol. The crude product is collected by filtration and recrystallized from ethanol; M.P. 234°–235° C. The resultant dihydro compound (100 g.) is slurried in 2.5 liters of 2.5% aqueous caustic and heated to 35° C. Sodium hypochlorite (450 ml. 10% solution) is gradually added while heating to 65° C. in one hour. The reaction mixture is clarified hot, cooled and acidified with acetic acid. The product is collected, washed with water and dried; M.P. 240–241° C.

EXAMPLES 17–21

Using Method (B) as exemplified in Example 16, substituting for the benzaldehyde equivalent amounts of o-anisaldehyde and other aldehyde starting materials, the products shown in the following Table II are obtained.

TABLE II

| Ex. No. | Starting Material | -4(3)-quinazolone |
|---|---|---|
| 17 | o-Anisaldehyde | 2-(2-methoxyphenyl)- |
| 18 | p-Tolualdehyde | 2-(4-methylphenyl)- |
| 19 | 4-chlorobenzaldehyde | 2-(4-chlorophenyl)- |
| 20 | 2,4-dichlorobenzaldehyde | 2-(2,4-dichlorophenyl)- |
| 21 | 4-ethoxy-3-methoxybenzaldehyde. | 2-(4-ethoxy-3-methoxyphenyl)- |

In the following examples preparation and utilization of the preferred subclass of compounds of Formula I are illustrated. As there noted, these compounds are within Formula I but have the structure

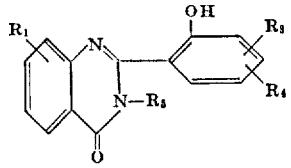

(II)

$R_1$, $R_3$, $R_4$ and $R_5$ are as defined above for Formula I. In most cases $R_1$ and $R_5$ will be hydrogen.

EXAMPLE 22

2-(2-hydroxyphenyl)-4(3)-quinazolone

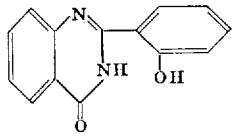

A mixture of 648. g. salicyclic acid, 580 g. thionyl chloride, and 3 ml. of pyridine is heated four hours at 40° C. The excess $SOCl_2$ is removed by vacuum distillation. This "as is" acid chloride is added dropwise to a stirred refluxing mixture of 500 g. anthranilamide, 635 g. of $K_2CO_3$ and 5.5 liters of dry ether. After refluxing 3 hours the ether is removed by distillation and the product washed with water. This is slurried in 14 liters of 5% NaOH and boiled for one hour. After cooling the solution was neutralized with acetic acid and the product was isolated by filtration; 634 g., M.P. 280°–284° C. This is recrystallized from acetic acid to give a light yellow solid, M.P. 297°–298° C.

EXAMPLE 23

The procedure of Example 22 is employed, substituting 4-ethoxysalicyclic acid in place of salicyclic acid, to synthesize 2-(4-ethoxy-2-hydroxyphenyl) - 4(3)-quinazolone.

EXAMPLE 24

2-(4-chloro-2-hydroxyphenyl)-4(3)-quinazolone

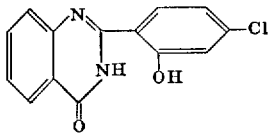

4-chlorosalicyclic acid (86.3 g., 0.5 m.), thionyl chloride (150 cc.) and pyridine (0.5 cc.) are stirred for 3 hours at 30–40° C. Excess $SOCl_2$ is removed by vacuum distillation below 40° C. The resulting acid chloride is added over a period of one-half hour to a mixture of 55 g. of anthranilamide and 70 g. of anhydrous potassium carbonate in 200 cc. of benzene and 450 g. of diethyl ether. The mixture is stirred overnight and then treated with 1400 cc. of 5% aqueous sodium hydroxide. The reaction mixture is heated to 90° C. for one hour, cooled and neutralized with acetic acid. The product is collected by filtration and recrystallized from phenol. It shows a melting point of 345°–7° C.

EXAMPLE 25

2-(2-hydroxy-3-methylphenyl)-4(3)-quinazolone

Seventy-six g. (0.5 m.) of 3-methylsalicylic acid is used in place of the 4-chlorosalicylic acid in Example 24. The product, recrystallized from ethanol, shows a melting point of 253–5° C.

EXAMPLE 26

2-(3,5-dichloro-2-hydroxyphenyl)-4(3)-quinazolone

One-half mol (103.5 g.) of 3,5-dichlorosalicylic acid is used in place of the 4-chlorosalicylic acid in Example 24. The desired product is purified from methyl Cellosolve.

EXAMPLE 27

One-half mol (148 g.) of 3,5-dibromo salicylic acid is employed in place of the 4-chlorosalicylic acid in Example 24. The product, 2-(3,5-dibromo-2-hydroxyphenyl)-4(3)-quinazolone is recrystallized from pyridine.

EXAMPLE 28

Eighty-six parts of 5 - chlorosalicylic acid is used in place of the 4 - chlorosalicylic acid in Example 24. The desired product, 2 - (5 - chloro - 2 - hydroxyphenyl)-4

(3) - quinazolone is isolated and recrystallized from dimethylformamide.

EXAMPLES 29–33

Using the general procedure of Example 24, but substituting the appropriate starting acid, the compounds shown in the following Table III are prepared.

TABLE III

| Ex. No.: | -4(3)-quinazolone |
|---|---|
| 29 | 2(2,4-dihydroxyphenyl)- |
| 30 | 2(2-hydroxy-4-butoxyphenyl)- |
| 31 | 2(2-hydroxy-5-butylphenyl)- |
| 32 | 2(2-hydroxy-5-iodophenyl)- |
| 33 | 2(2-hydroxy-4-methoxyphenyl)- |

It is also within the scope of the present invention to convert the 2-hydroxyphenyl compounds into other derivatives by further reaction of the hydroxyl group. This is shown in the following examples.

EXAMPLE 34

2-(2-carbethoxyoxyphenyl)-4(3)-quinazolone

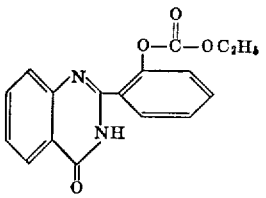

2 - (2 - hydroxyphenyl) - 4(3) - quinazolone (71.5 g., 0.3 m.) and sodium hydroxide (13.2 g., 0.3 m.) in 1000 cc. of water is treated with 38.5 g. (0.33 m.) of ethyl chlorocarbonate. The reaction is complete after one-half hour and the product is collected by filtration. The product is recrystallized several times from a 3:1 mixture of toluene and methylcyclohexane, M.P. 145–6° C.

EXAMPLE 35

(1) 2-(2-hydroxyphenyl)-3-methyl-4(3)-quinazolone (2) 2-(2-methoxyphenyl)-3-methyl-4(3)-quinazolone 2 - (2 - hydroxyphenyl) - 4(3) - quinazolone (59.5 g., 0.25 m.), sodium hydroxide (30 g.) and potassium carbonate (10 g.) are dissolved in 1700 cc. of water and treated with 140 cc. of dimethyl sulfate and 120 cc. of 50% aqueous sodium hydroxide concurrently. Solid was filtered off and recrystallized from ethanol. The product analyzed for the 2-methoxyphenyl derivative.

The alkaline filtrate from above is acidified and solid collected. Recrystallized from ethanol, the product analyzed correctly for the 2-hydroxpyhenyl derivative.

EXAMPLE 36

A mixture of 2 - (2 - hydroxyphenyl) - 4(3) - quinazolone 11.9 g. (.05 m.) and 7.6 g. (.06 m.) of butyl bromide in 200 ml. of acetone containing 7.9 g. (.05 m.) of anhydrous potassium carbonate is refluxed for 12 hours. The reaction mixture is then added to water and the solid product collected. The solid is extracted with alcoholic aqueous sodium hydroxide and the extract is neutralized with dilute hydrochloric acid. The product, 3 - butyl - 2 - (2 - hydroxy - phenyl) - 4(3) - quinazolone, is collected and purified.

EXAMPLE 37

The above procedure is used to prepare: 3 - ethyl - 2-(2 - hydroxy - 3,5 - dichlorophenyl) - 4(3) - quinazolone from ethyl iodide and 2 - (2 - hydroxy - 3,5 - dichlorophenyl) - 4(3) - quinazolone and to prepare a 3 - propyl-2 - (2 - hydroxy - 3 - methylphenyl) - 4(3) - quinazolone from 2 - (2 - hydroxy - 3 - methylphenyl) - 4(3) - quinazolone and propyl bromide.

As noted above, in the solid state, compounds of this invention exhibit a wide range of fluorescent color. Typical illustrations of fluorescent color when exposed to UV radiation (3650 A.) in the solid state are shown in the following table.

TABLE IV

| -4(3)-quinazolone: | Color of fluorescence |
|---|---|
| 2-phenyl | Light violet. |
| 2-(4-methoxyphenyl) | Blue white. |
| 2-phenyl-6-methoxy | Do. |
| 2-phenyl-6-chloro | Violet. |
| 2-(4-methoxyphenyl)-6-butyl | Blue white. |
| 2-(4-methoxyphenyl)-6-methoxy | Do. |
| 2-(4-methoxyphenyl)-8-methoxy | Do. |
| 2-(2-methoxyphenyl) | Light yellowish green. |
| 2-(4-ethoxy-3-methoxyphenyl) | White. |
| 2-(2-methoxyphenyl)-3-methyl | Light violet. |
| 2-(2-hydroxyphenyl) | Green. |
| 2-(2-hydroxy-4-ethoxyphenyl) | Bluish white. |
| 2-(2-hydroxy-4-chlorophenyl) | Green. |
| 2-(2-hydroxy-3-methylphenyl) | Yellow green. |
| 2-(2-hydroxy-3,5-dichlorophenyl | Yellow. |
| 2-(2-hydroxy-5-chlorophenyl) | Yellow green. |
| 2-(2-hydroxyphenyl)-3-methyl | Green. |

The 2 - (2 - hydroxyaryl) - 4(3) - quinazolones had intensities of fluorescence vastly superior to the derivatives not possessing 2-hydroxyaryl structures.

EXAMPLE 38

Illustrative 4(3)-quinazolones were examined in sodium chloride wafers to determine the intensity of luminescence and light stability as shown by the percent luminescence remaining after prolonged exposure to UV light. Wafers containing 0.2% luminescer are prepared by grinding the luminescer with the NaCl in a porcelain mortar until a fine powder having uniform luminescence under a black light is obtained. One or two grams of this powdered mixture is sintered in a 1.750-inch diameter die, at a pressure of 150,000 lb./in.$^2$ to form a transparent to translucent wafer. The wafer is then mounted on a 2 x 2 inch optical glass slide with black, pressure-sensitive plastic tape. Observations are made on the color ol luminescence under black light. The intensity of fluorescence of each wafer is determined using a Galvanek-Morrison fluorimeter. Fluorescence is compared to a blue fluorescing plastic sheet which is used as a standard for comparative purposes and is arbitrarily assigned the fluorescent strength of 1.0. In order to allow the intensity of luminescence to stabilize, the first 100 hours of exposure are considered as a break-in period. The wafers are aged in a fluorescent sun lamp black light exposure unit (FSBL) and the change of fluorescent intensity with time of exposure is determined. In the following Table IV, illustrative results obtained with one gram wafers containing various quinazolones after 3380 hours exposure are given. Results obtained with 4(3)-quinazolones that do not have the 2-hydroxy substituent are first shown; followed by those for the new 2-hydroxy compounds of the present invention.

TABLE IV

| -4(3)-quinazolone | Color of Luminescence | Relative Initial Intensity | Percent Luminescence After Exposure |
|---|---|---|---|
| 2-(4-methoxyphenyl)- | Blue | 0.24 | 24 |
| 2-phenyl- | Dull blue | 0.10 | 27 |
| 6-methoxy-2-phenyl- | do | 0.05 | 28 |
| 2-(2-hydroxy-4-ethoxyphenyl)- | Aqua | 0.84 | 65 |
| 2-(2-hydroxyphenyl)-4(3)-quinazolone. | Green | 0.86 | 73 |

In the following Table V typical results obtained using two gram wafers exposed for 3100 hours are shown.

TABLE V

| -4(3)-quinazolone | Color of Luminescence | Relative Initial Intensity | Percent Luminescence After Exposure |
|---|---|---|---|
| 2-phenyl- | Blue | 0.36 | 47 |
| 6-methoxy-2-phenyl- | Dull blue | 0.50 | 41 |
| 6-chloro-2-phenyl | do | 0.05 | (2) |
| 6-butyl-2-(methoxyphenyl)- | Blue | 0.19 | 38 |
| 6-methoxy-2-(4-methoxyphenyl). | do | 0.24 | 52 |
| 8-methoxy-2-(-4-methoxyphenyl). | do | 0.46 | 26 |
| 2-(2-methoxyphenyl) | White | 0.67 | 52 |
| 2-(2-hydroxyphenyl) | Green | 0.91 | 83 |
| 2-(2-hydroxy-4-ethoxyphenyl) | Blue white | 1.1 | 74 |

In the following Table VI illustrative results on two gram wafers after 4700 hours exposure are shown.

TABLE VI

| -4(3)-quinazolone | Color of Luminescence | Relative Initial Intensity | Percent Luminescence After Exposure |
|---|---|---|---|
| 2-(2-hydroxyphenyl) | Green | 0.91 | 71 |
| 2-(4-methoxyphenyl) | Dull white | 0.33 | 23 |

As can be seen from Tables IV, V and VI, the intensity of luminescence and light stability of the 2-(2-hydroxyaryl)-quinazolones are markedly superior.

EXAMPLE 39

The 2-hydroxyphenyl derivative of Example 22 was evaluated as the fluorescer in (1) a colorless unpigmented ink composition; and (2) in colored pigmented ink compositions. The resultant coatings have one appearance by daylight and a different appearance or color of strong intensity under UV light. Preparations of the inks and illustrative results are shown as follows:

(1) Unpigmented ink

Colorless inks, luminescent green under ultraviolet light, were prepared by milling differing amounts of the compound of Example 22 into a commercial ink vehicle (IPI K–592 Vaposet). Drawdowns were made from this ink and samples were subjected to black light exposure. The intensity of fluorescence of each drawdown was determined (by the procedure of Example 37) and the hours of exposure necessary to decrease the luminescence to a relative intensity of 0.01 were then determined. Illustrative results are shown in Table VII below.

TABLE VII

| Percent Conc. | Relative Initial Intensity | Hours Exposure |
|---|---|---|
| 3 | 0.36 | 1,200 |
| 5 | 0.66 | 1,975 |

(2) Pigmented inks

The compound was incorporated by the same procedure, i.e., by milling into samples of the same commercial ink vehicle pigmented with the following commercial pigments: (A) Litho Red; (B) Chrome Green; and (C) Iron Blue respectively. Illustrative results are shown below in Table VIII.

TABLE VIII

| | Parts per Hundred of— | | Compound (percent added) | Color | |
|---|---|---|---|---|---|
| | Pigment | Vehicle | | Daylight | Black Light |
| (A) | 15 | 85 | None | Red | Red. |
| | | | 10 do | | Yellow. |
| (B) | 50 | 50 | None | Green | Black. |
| | | | 10 do | | Green. |
| (C) | 33.3 | 66.6 | None | Blue | Black. |
| | | | 10 do | | Green. |

EXAMPLE 40

Samples of molybdate orange and chrome green type "T" rotogravure inks containing 5% of the compounds of Example 22 and of Example 23 were prepared by shot milling the additives into the wet inks using a two-roll blending machine. A blending time of 24 hours was allowed. Drawdowns were made and examined under visible and black light. Observations are as recorded in Table IX.

TABLE IX

| Ink | Paper Stock Color | Additive Percent | Additive Ex. No. | Black Light Fluorescence Color | Visual Color |
|---|---|---|---|---|---|
| Roto-orange | Green tint | 0 | | None | Reddish-orange. |
| | | 5 | 22 | Yellow | Do. |
| | | 5 | 23 | Dull green | Do. |
| Do | White bond (brightened) | 0 | | Very dull red | Reddish-orange. |
| | | 5 | 22 | Tan | Do. |
| | | 5 | 23 | Brown | Do. |
| Roto-green | Green tint | 0 | | Very dull greenish-gray | Green. |
| | | 5 | 22 | Bright green | Do. |
| | | 5 | 23 | Bluish-green | Do. |
| Do | White bond (brightened) | 0 | | Very dull greenish-gray | Green. |
| | | 5 | 22 | Green | Do. |
| | | 5 | 23 | Bluish-green | Do. |

Two samples of fluorescent type "T" rotogravure ink were prepared by shot milling the following formulations on a 2-roll blender for 24 hours.

| Formulation A: | Parts |
|---|---|
| Type "T" Vehicle | 70 |
| Chrome Green | 15 |
| Luminescer (Ex. 13) | 15 |
| | 100 |

| Formulation B: | |
|---|---|
| Type "T" Vehicle | 60 |
| Molybdate Orange | 20 |
| Luminescer (Ex. 13) | 20 |
| | 100 |

A drawdown of Formula A roto ink exhibited a strong green fluorescence while a drawdown of Formula B exhibited a strong yellow fluorescence under the black light.

EXAMPLE 41

2-(2-hydroxyphenyl)-4(3)-quinazolone was incorporated at 25% concentration into a commercial black letterpress ink. A three-roll ink mill was used to incorporate the additive into the ink sample. Six passes were made at 500 pounds yielding an ink giving a 7+ on a Hegman gauge. A drawdown showed a strong green luminescence under black light.

Samples of letterpress black ink were similarly prepared with several standard commercial inorganic luminescencers such as zinc sulfide or zinc cadmium sulfide. The drawdowns of these exhibited only faint luminescence under black light.

Samples of letterpress black ink were similarly prepared with compounds of Examples 16, 18 and 19. The drawdowns exhibit strong yellow green, yellow and yellow green luminescence respectively, under black light.

EXAMPLE 42

Two and one-half grams of compound of Example 22 is thoroughly mixed into 7.5 g. of a white-paint having the following formulation:

| | Percent |
|---|---|
| Titanium dioxide | 11.0 |
| Titanium calcium | 30.0 |
| Zinc oxide | 2.4 |
| Linseed soya-alkyd resin | 23.9 |
| Mineral spirits | 30.4 |
| Driers | 2.3 |

A drawdown is prepared which has intense green fluorescence under black light.

EXAMPLE 43

Seven and one-half grams of a varnish consisting of 50% linseed soya ester gum alkyd resin in 50% petroleum thinner and driers is treated with 2.5 g. of compound of Example 22. A drawdown is prepared which is essentially colorless and which luminesces bright green under black light.

EXAMPLE 44

To 7.5 g. of a pastel green paint having the following formulation:

| | Percent |
|---|---|
| Titanium dioxide | 17 |
| Magnesium sulfate | 14 |
| Barium sulfate | 8 |
| Green tinting color | 1 |
| Polyvinylacetate copolymer | 12 |
| Water | 48 |

is added 2.5 g. of compound of Example 22 and 5 g. of water. A drawdown has a pastel green visible color and a strong green luminescence under black light.

EXAMPLE 45

2-(2-hydroxyphenyl)-4(3)-quinazolone is incorporated at 5% by weight into a polyvinyl chloride homopolymer formulation of 100 parts Geon 103 EP, 2 parts Thermolite 31, and 0.5 part stearic acid. A 2-roll rubber mill is used for incorporation. The mill rolls are gapped at 0.010 inch and heated to 165° C. The polymer formulation dry blended with the 2-(2-hydroxyphenyl)-4(3)-quinazolone is allowed to band and is milled for 5 minutes. The polymer is again banded and removed from the mill as a sheet. Under black light the polymer containing 5% 2-(2-hydroxyphenyl)-4(3)-quinazolone emits a strong green luminescence.

EXAMPLE 46

2-(2-hydroxyphenyl)-4(3)-quinazolone is incorporated at 5% by weight into Goodrich Abson ABS polymer using procedure described in Example 45. Under black light the polymer emits a strong green luminescence.

EXAMPLE 47

2-(2-hydroxyphenyl)-4(3)-quinazolone is incorporated at 5% by weight into Hercules Profax 6501 polypropylene using procedure described in Example 45. Under black light polymer emits a strong green luminescence.

EXAMPLE 48

2-(2-hydroxy-4-ethoxyphenyl)-4(3)-quinazolone is incorporated into the PVC homopolymer formulation described in Example 45, using the procedure of Example 45. The polymer under black light emits a strong blue luminescence.

We claim:

1. A compound of the formula

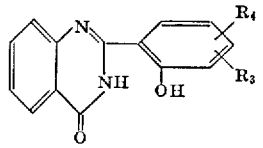

wherein $R_3$ and $R_4$ are selected from the group consisting of hydrogen, hydroxyl, halogen and 1–4 carbon alkyl and alkoxy.

2. 2-(2-hydroxyphenyl)-4(3)-quinazolone.

3. 2-(2-hydroxy-4-methoxyphenyl)-4(3)-quinazolone.

4. 2 - (3,5 - dichloro - 2 - hydroxyphenyl) - 4(3)-quinazolone.

5. 2 - (5 - chloro - 2 - hydroxyphenyl) - 4(3) - quinazolone.

6. 2 - (2 - hydroxy - 3 - methylphenyl) - 4(3) - quinazolone.

7. 2 - (4 - ethoxy - 2 - hydroxyphenyl) - 4(3) - quinazolone.

*8. A compound of the formula:*

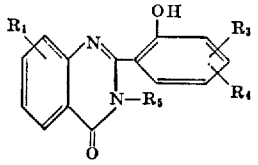

*wherein $R_1$, $R_3$ and $R_4$ are each individually either hydrogen, hydroxyl, halogen, alkyl of 1–4 carbons or alkoxy of 1–4 carbons, and $R_5$ is either hydrogen or alkyl of 1–4 carbons.*

*9. A compound of claim 8 wherein $R_5$ is hydrogen.*

References Cited

The following references, cited by the Examiner, are of record in the patented file of this patent or the original patent.

UNITED STATES PATENTS

| | | | |
|---|---|---|---|
| 2,439,386 | 4/1948 | Guenther et al. | 260—251 |
| 3,010,908 | 11/1961 | Broderick et al. | 260—251 |
| 3,066,105 | 11/1962 | McCafferty | 260—251 |
| 3,127,401 | 3/1964 | Lawes et al. | 260—251 |

JAMES A. PATTEN, *Primary Examiner.*

U.S. Cl. X.R.

260—566; 252—301.2; 240—1.1; 117—33.5; 106—21, 22, 288